United States Patent
Lee et al.

(10) Patent No.: US 7,329,714 B2
(45) Date of Patent: Feb. 12, 2008

(54) METHOD OF POLYMERIZING PROPYLENE COMPRISING OLEFIN PRE-POLYMERIZATION STEP

(75) Inventors: Nan-young Lee, Seoul (KR); Churl-young Park, Daejeon (KR); Jin-woo Lee, Daejeon (KR); Yi-young Choi, Daejeon (KR); So-young Park, Seoul (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 11/624,474

(22) Filed: Jan. 18, 2007

(65) Prior Publication Data
US 2007/0208147 A1    Sep. 6, 2007

(30) Foreign Application Priority Data
Mar. 6, 2006   (KR) .................. 10-2006-0020946

(51) Int. Cl.
*C08F 110/06* (2006.01)
(52) U.S. Cl. .................. 526/351; 526/904; 526/125.3; 502/103; 502/116
(58) Field of Classification Search ............... 526/351, 526/904, 125.3; 502/103, 116
See application file for complete search history.

(56) References Cited

U.S. PATENT DOCUMENTS

| | | |
|---|---|---|
| 3,642,746 A | 2/1972 | Kashiwa et al. |
| 3,642,772 A | 2/1972 | Haid |
| 3,899,477 A | 8/1975 | Altemore et al. |
| 4,148,756 A | 4/1979 | Langer, Jr. |
| 4,158,642 A | 6/1979 | Langer, Jr. |
| 4,330,649 A | 5/1982 | Kioka et al. |
| 4,336,360 A | 6/1982 | Giannini et al. |
| 4,447,639 A | 5/1984 | Sofranko et al. |
| 4,482,687 A | 11/1984 | Noshay et al. |
| 4,518,706 A | 5/1985 | Gessell |
| 4,866,022 A | 9/1989 | Arzoumanidis et al. |
| 5,103,702 A | 4/1992 | Yannazzone |
| 5,124,297 A | 6/1992 | Arzoumanidis et al. |
| 5,652,303 A * | 7/1997 | Ishimaru et al. ......... 526/125.3 |
| 5,652,304 A | 7/1997 | Calderone et al. |

FOREIGN PATENT DOCUMENTS

| | | |
|---|---|---|
| DE | 2553104 A1 | 6/1977 |
| EP | 0131832 A1 | 1/1985 |
| EP | 0658577 A2 | 6/1995 |
| GB | 1335887 | 10/1973 |
| JP | 5600811 | 7/1981 |

OTHER PUBLICATIONS

Zucchini et al; "Control of Molecular-Weight Distribution in Polyolefins Synthesized with Ziegler-Natta Catalytic Systems"; Adv. In Polymer Science; 51; pp. 101-153; (1983).

* cited by examiner

Primary Examiner—Ling-Sui Choi
(74) Attorney, Agent, or Firm—Cantor Colburn LLP

(57) ABSTRACT

The present invention relates to a method of polymerizing olefin containing the step of pre-polymerization. More precisely, according to the method of the present invention, the reaction speed and temperature are regulated for pre-polymerization of a catalyst and then the pre-polymerized catalyst is added for the polymerization of propylene. Propylene having an improved molecular weight distribution, hydrogen reactivity and tacticity is produced.

12 Claims, No Drawings

METHOD OF POLYMERIZING PROPYLENE COMPRISING OLEFIN PRE-POLYMERIZATION STEP

This application claims the benefit of the filing date of Korean patent Application No. 10-2006-0020946 filed on Mar. 6, 2006 in the Korean Intellectual Property Office, the disclosure of which is incorporated herein in its entirety by reference.

TECHNICAL FIELD

The present invention relates to a method of polymerizing propylene comprising an olefin pre-polymerization step, and more precisely, a method for polymerizing propylene with improved molecular weight distribution, hydrogen reactivity and tacticity, which contains the step of olefin pre-polymerization using a Ziegler catalyst, and the step of propylene polymerization using the said activated catalyst.

BACKGROUND ART

A polymer having a wide molecular weight distribution is generally applicable to the production of industrial pipes, films and sheets, whereas a polymer having a narrow molecular weight distribution is used for injection molding. The above two types of polymers are clearly distinguished by the difference in molecular weight distribution, determined by the ratio of weight average molecular weight to number average molecular weight, and by the difference in melt flow rate.

A polymer polymerized in a slurry or vapor single reactor in the presence of a Ziegler catalyst generally has a narrow molecular weight distribution. Such polymers having a narrow molecular weight distribution have limited tensile strength, which causes deformity during processing. In addition, they are not appropriate for a processing method requiring high mechanical resistance in melting point.

Approaches have been made to prepare a polymer having a wide molecular weight distribution using a Ziegler catalyst. As an example, Zucchini U. and G. Cecchin reported a method for subsequent or gradual polymerization in the presence of a Ziegler-Natta catalyst using at least two different reactors to prepare a polymer having a wide molecular weight distribution (Adv. In Polymer Science 51, 101~153 (1983)). However, the process of this method is complicated and thus is likely to cause problems in the production of a real product. European Patent No. 658577 (Himont) describes a high-stereoregular polypropylene having a wide molecular weight distribution prepared using two reactors.

Regarding a catalyst for the preparation of a polymer having a wide molecular weight distribution, Altemore et al described in U.S. Pat. No. 3,8909,477 the use of titanium halide, vanadium halide and an organic aluminum compound as a mixed catalyst. Particularly, according to this description, the co-treatment of allyl aluminum sesqui ethoxide and trialkyl aluminum with a catalyst before polymerization can generate a polymer having a wide molecular weight distribution. However, this catalyst preparation is very complicated and it is also very difficult to control the polymerization since the reactivity of the titanium and vanadium sources, the monomers and the comonomers are different.

To improve fluidity, olefin polymers having different molecular weight distributions have been polymerized in different reactors and then mixed. However, this method requires a long production time and produces uneven products. According to the recent report by Mitsui Petrochemical Corp. (Japan) (Korean Patent Publication No. 1990-0014436), an olefin polymer having a wide molecular weight distribution can be produced by using at least two specific electron donors, in which the ratio of melt flow rate (MFR) of homo-polymers prepared under the same polymerization conditions is higher than 31.6. However, the activity of a catalyst used in this method is very low, suggesting that regulation of the molecular weight distribution of the polymer is difficult, which means the product might not be commercially viable and the processing itself is limited by the low hydrogen reactivity involved in the regulation of the polymer's melt flow rate (MFR). U.S. Pat. No. 5,652,303 by Mitsui Petrochemical Corp. also describes that molecular weight distribution and tacticity can be regulated by using at least two external electron donors.

Pre-polymerization methods for the preparation of polymers or copolymers having excellent hydrogen reactivity and tacticity, which use a titanium catalyst containing at least three different carbon atoms, specifically electron donor treated magnesium and solid complex titanium containing titanium and a halogen, for the polymerization or copolymerization of alpha-olefin have been proposed (Japanese Patent Publication No. 73-16986, No. 73-16987 and German Patent Publication No. 2,153,520, No. 2,230,672, No. 2,230,728, No. 2,230,752 and No. 2,553,104).

These pre-polymerization methods include the processes of mixing the catalyst components and forming a catalyst. The characteristics of the solid titanium containing catalyst depend on the mixing and forming conditions. Therefore, it is impossible to expect similar results from different conditions. Sometimes a catalyst with poor quality might be produced. Even if a catalyst is prepared under the required conditions, the activity of the catalyst or tacticity of a polymer will not be satisfactory without the addition of external electron donors.

The solid complex titanium catalyst containing minimum levels of magnesium, titanium and a halogen is also affected by the added electron donor. When an alpha-olefin containing at least three carbon atoms is polymerized or copolymerized in the presence of hydrogen and a catalyst composed of titanium and an organic metal compound (family 1-family 4 metals of the periodic table), the results might be unexpectedly changed by the addition of the electron donor. Particularly, when a catalyst composed of titanium trichloride which is converted from titanium tetrachloride using a metal aluminum, hydrogen or an organic aluminum compound is used together with the electron donor, the results of polymerization vary with the kind of electron donor that is added. Thus, it seems that the electron donor is not a simple additive but an important factor involved in the construction of the microstructure of a solid complex catalyst by binding magnesium and titanium compounds sterically and electronically.

In general, pre-polymerization indicates the process of forming a thin olefin film on a catalyst at a moderate reaction temperature and low monomer concentration. At this time, conventional solid titanium catalysts for olefin polymerization are acceptable as the pre-polymerization catalyst, and a Ziegler-Natta catalyst is an example, as described in U.S. Pat. No. 4,482,687, No. 3,642,746, No. 3,642,772, No. 4,158,642, No. 4,148,756, No. 4,447,639, No. 4,518,706, No. 4,866,022, No. 5,103,702, No. 5,124,297, No. 4,330, 649, European Patent No. 131,832, Japanese Patent Publication No. 63-54004.

The effects of the pre-polymerization are as follows. First is the rate enhancement effect, which means active species are increased by the pre-polymerization and thus the activity increases. During the pre-polymerization, new active sites are formed in a catalyst or a proper ligand is formed by alpha-olefin, leading to the activation of dormant sites. Second is the molecular specification effect. In the pre-polymerization, aspecific sites are capsulated by a polymer in the early stage of polymerization and thus deactivated, leading to the increase of the early stage reaction speed for isotactic fraction and the improvement of tacticity. Third is the morphology improvement effect. The pre-polymerization results in the even fractionation of a catalyst, suggesting that regular sized and shaped particles are formed, without coagulation of the catalyst. As a result, fines are reduced, whereas bulk density is increased, and therefore particle size distribution is regular and morphology is improved. As explained hereinbefore, such pre-polymerization helps polymerization to improve the desired properties of a polymer with a simple process.

However, the entire mechanism of the pre-polymerization has not yet been explained. It was difficult to regulate pre-polymerization conditions with a Ziegler catalyst to generate a polymer having improved molecular weight distribution, hydrogen reactivity and tacticity.

DISCLOSURE OF THE INVENTION

It is an object of the present invention to provide a method of polymerizing propylene having a wide molecular weight distribution and improved hydrogen reactivity and tacticity by means of olefin pre-polymerization.

The above object and other objects of the present invention can be achieved with the following embodiments of the present invention.

To achieve the above object, the present invention provides a method of polymerizing propylene comprising the following steps:

Pre-polymerizing a Ziegler-Natta catalyst with olefin in the presence of an external electron donor; and Polymerizing the pre-polymerized Ziegler-Natta catalyst with propylene.

According to an exemplary embodiment of the present invention, the reaction temperature of the pre-polymerization is −10~50° C.

According to another exemplary embodiment of the present invention, the reaction temperature of the pre-polymerization is 0~40° C.

According to an exemplary embodiment of the present invention, the reaction time of the pre-polymerization is 0.1~10 hours.

According to another exemplary embodiment of the present invention, the reaction time of the pre-polymerization is 0.5~5 hours.

According to an exemplary embodiment of the present invention, the Ziegler-Natta catalyst contains a transition metal compound comprising elements of family 4, family 5 or family 6 of the periodic table; and an organic metal compound comprising elements of family 12 or family 13 of the periodic table.

According to an exemplary embodiment of the present invention, the molar ratio of the organic metal compound to the transition metal compound is 5~50.

According to an exemplary embodiment of the present invention, a solid titanium catalyst containing magnesium, titanium, a halogen and an internal electron donor can be used as the transition metal compound.

According to an exemplary embodiment of the present invention, an organic aluminum compound can be used as the organic metal compound.

According to an exemplary embodiment of the present invention, the organic aluminum compound is selected from a group consisting of a trialkyl aluminum, a dialkyl aluminum halide, an alkyl aluminum dihalide, an aluminum dialkyl hydride, an alkyl aluminum sesquihalide, and a mixture thereof.

According to an exemplary embodiment of the present invention, the organic metal compound is selected from a group consisting of $Al(C_2H_5)_3$, $Al(C_2H_5)_2H$, $Al(C_3H_7)_3$, $Al(C_3H_7)_2H$, $Al(i-C_4H_9)_2H$, $Al(C_8H_{17})_3$, $Al(C_{12}H_{25})_3$, $Al(C_2H_5)(C_{12}H_{25})_2$, $Al(i-C_4H_9)(C_{12}H_{25})_2$, $Al(i-C_4H_9)_3$, $(C_2H_5)_2AlCl$, $(i-C_4H_9)_2AlCl$, and $(C_2H_5)_3Al_2Cl_3$.

According to an exemplary embodiment of the present invention, the organic metal compound is selected from a group consisting of a mixture of $Al(C_2H_5)_3$ and $Al(i-C_4H_9)_3$; a mixture of $Al(C_2H_5)_3$ and $Al(C_8H_{17})_3$; a mixture of $Al(C_4H_9)_2H$ and $Al(C_8H_{17})_3$; a mixture of $Al(i-C_4H_9)_3$ and $Al(C_8H_{17})_3$; a mixture of $Al(C_2H_5)_3$ and $Al(C_{12}H_{25})_3$; a mixture of $Al(i-C_4H_9)_3$ and $Al(C_{12}H_{25})_3$; a mixture of $Al(C_2H_5)_3$ and $Al(C_{16}H_{33})_3$; and a mixture of $Al(C_3H_7)_3$ and $Al(C_{18}H_{37})_2(i-C_4H_9)$.

According to an exemplary embodiment of the present invention, the molar ratio of the external electron donor to the transition metal compound is 1~50.

According to an exemplary embodiment of the present invention, the internal electron donor can be a diether compound, a phthalate compound, or a mixture thereof.

According to another exemplary embodiment of the present invention, an organic silane compound containing one or more oxygen atoms and one or more functional groups selected from a group consisting of a substituted or unsubstituted $C_1$~$C_{20}$ alkyl group, a substituted or unsubstituted $C_6$~$C_{30}$ aryl group, a substituted or unsubstituted $C_5$~$C_{30}$ cycloalkyl group, and a substituted or unsubstituted $C_1$~$C_{20}$ alkoxy group can be used as the external electron donor.

According to an exemplary embodiment of the present invention, the external electron donor can be selected from a group consisting of aromatic organic silane compounds such as diphenyldimethoxysilane, phenyltrimethoxysilane, phenylethyldimethoxysilane and phenylmethyldimethoxysilane; aliphatic organic silane compounds such as trimethylmethoxysilane, isobutyltrimethoxysilane, diisobutyldimethoxysilane, diisopropyldimethoxysilane, di-t-butyldimethoxysilane, dicyclopentyldimethoxysilane, cyclohexylmethyldimethoxysilane and dicyclohexyldimethoxysilane; and a mixture thereof.

According to an exemplary embodiment of the present invention, olefin is added to the pre-polymerization process at 0.02~10 g olefin/g Ziegler-Natta catalyst/hour.

According to another exemplary embodiment of the present invention, olefin is added to the pre-polymerization process at 0.02~6 g olefin/g Ziegler-Natta catalyst/hour.

According to an exemplary embodiment of the present invention, the molecular weight distribution (Mw/Mn) of a polymer produced by the above polymerization is 5.0±0.5.

According to an exemplary embodiment of the present invention, the tacticity of a polymer produced by the above polymerization is 99±1%.

According to an exemplary embodiment of the present invention, melt flow rate (230° C., 2.16 kg) of a polymer produced by the above polymerization is 4±2 g/10 minutes.

Hereinafter, the present invention is described in detail.

According to the method of polymerizing propylene of the present invention, a Ziegler-Natta catalyst is pre-polymerized with olefin at low temperature and then the product is used for the polymerization of propylene to improve hydrogen reactivity and tacticity, and to provide a wide molecular weight distribution.

In the present invention, 'polymerization' following the pre-polymerization indicates not only homo polymerization of propylene but also co-polymerization of an alpha-olefin such as ethylene, 1-butene and 1-hexene with propylene.

The pre-polymerization of olefin indicates the process of pre-polymerization of olefin with a Ziegler-Natta catalyst in the presence of an external electron donor. At this time, the reaction temperature and time are critical factors affecting the properties of a final product such as tacticity, molecular weight distribution and melt flow rate, etc.

The preferable reaction temperature for the pre-polymerization is −10° C.~50° C., and more preferably 0° C.~40° C. If the reaction temperature for the pre-polymerization is lower than −10° C., the pre-polymerization will not be completed and thus the effect of the present invention will be in question. If the reaction temperature is higher than 50° C., the catalyst used for the polymerization will not be fully activated, resulting in inefficiency.

The preferable reaction time for the pre-polymerization is 0.1~10 hours and more preferably 0.5~5 hours. If the reaction time is shorter than 0.1 hour, the pre-polymerization will not be completed and thus the effect of the invention will be in question. If the reaction time is longer than 10 hours, the reaction will be uneconomical.

During the pre-polymerization, a Ziegler-Natta catalyst is dissolved into even particles, on which olefin is loaded. Any conventional Ziegler-Natta catalyst acceptable for olefin polymerization can be used herein without limitation, but a catalyst containing a transition metal compound harboring family 4, family 5 or family 6 elements of the periodic table; and an organic metal compound harboring family 12 or family 13 elements of the periodic table is preferred.

The transition metal compound included in the Ziegler-Natta catalyst acts as a main catalyst, and is exemplified by a solid titanium catalyst containing magnesium, titanium, a halogen element and an internal electron donor. The internal electron donor can be a diether compound, a phthalate compound or a mixture thereof, and diisobutylphthalate is more preferably used.

The organic metal compound included in the Ziegler-Natta catalyst acts as a co-catalyst, and can be an organic aluminum compound selected from a group consisting of trialkyl aluminum, diallyl aluminum halide, alkyl aluminum dihalide, aluminum dialkyl hydride and alkyl aluminum sesquihalide. Particularly, the organic metal compound is selected from a group consisting of $Al(C_2H_5)_3$, $Al(C_2H_5)_2H$, $Al(C_3H_7)_3$, $Al(C_3H_7)_2H$, $Al(i-C_4H_9)_2H$, $Al(C_8H_{17})_3$, $Al(C_{12}H_{25})_3$, $Al(C_2H_5)(C_{12}H_{25})_2$, $Al(i-C_4H_9)(C_{12}H_{25})_2$, $Al(i-C_4H_9)_3$, $(C_2H_5)_2AlCl$, $(i-C_4H_9)_2AlCl$ and $(C_2H_5)_3Al_2Cl_3$.

The organic metal compound can be a mixture of organic aluminum compounds, which is a mixture of the organic metal compounds of family 12 or family 3 of the periodic table, in particular a mixture of different organic metal compounds belonging to them. For example, a mixture of $Al(C_2H_5)_3$ and $Al(i-C_4H_9)_3$; a mixture of $Al(C_2H_5)_3$ and $Al(C_8H_{17})_3$; a mixture of $Al(C_4H_9)_2H$ and $Al(C_8H_{17})_3$; a mixture of $Al(i-C_4H_9)_3$ and $Al(C_8H_{17})_3$; a mixture of $Al(C_2H_5)_3$ and $Al(C_{12}H_{25})_3$; a mixture of $Al(i-C_4H_9)_3$ and $Al(C_{12}H_{25})_3$; a mixture of $Al(C_2H_5)_3$ and $Al(C_{16}H_{33})_3$; and a mixture of $Al(C_3H_7)_3$ and $Al(C_{18}H_{37})_2(i-C_4H_9)$ can be used as the organic metal compound of the present invention.

It is more preferred to select a chlorine-free compound as the organic aluminum compound. The chlorine-free compound is a $C_1$~$C_6$ hydrocarbon radical, preferably $Al(i-C_4H_9)_3$ or $Al(i-C_4H_9)_2H$ and a $C_4$~$C_{20}$ olefin, more preferably a reactant of isoprene and aluminum trialkyl or aluminum dialkyl hydride. Aluminum isoprenyl is the example.

Another acceptable chlorine-free aluminum-organic compound is trialkyl aluminum containing a $C_1$~$C_{16}$ hydrocarbon or a general aluminum dialkyl hydride, which is exemplified by $Al(C_2H_5)_3$, $Al(C_2H_5)_2H$, $Al(C_3H_7)_3$, $Al(C_3H_7)_2H$, $Al(i-C_4H_9)_3$, $Al(i-C_4H_9)_2H$, $Al(C_8H_{17})_3$, $Al(C_{12}H_{25})_3$, $Al(C_2H_5)(C_{12}H_{25})_2$ and $Al(i-C_4H_9)(C_{12}H_{25})_2$.

The transition metal compound acting as a main catalyst as included in the Ziegler-Natta catalyst is used together with a co-catalyst, the organic metal compound. At this time, the molar ratio of the organic metal compound to the transition metal compound is 5~50.

As the external electron donor, an organic silane compound containing one or more oxygen atoms and one or more functional groups selected from a group consisting of a substituted or unsubstituted $C_1$~$C_{20}$ alkyl group, a substituted or unsubstituted $C_6$~$C_{30}$ aryl group, a substituted or unsubstituted $C_5$~$C_{30}$ cycloalkyl group, and a substituted or unsubstituted $C_1$~$C_{20}$ alkoxy group can be used. Preferably, the external electron donor can be selected from a group consisting of aromatic organic silane compounds such as diphenyldimethoxysilane, phenyltrimethoxysilane, phenylethyldimethoxysilane and phenylmethyldimethoxysilane; aliphatic organic silane compounds such as trimethylmethoxysilane, isobutyltrimethoxysilane, diisobutyldimethoxysilane, diisopropyldimethoxysilane, di-t-butyldimethoxysilane, dicyclopentyldimethoxysilane, cyclohexylmethyldimethoxysilane and dicyclohexyldimethoxysilane; and a mixture thereof.

The preferable content of the external electron donor to the transition metal compound is 1~50 (molar ratio).

The olefin provided for the pre-polymerization is selected from a group consisting of alpha-olefins such as ethylene, propylene, 1-butene, 1-hexene and 4-methyl-1-pentene. The olefin is added to the pre-polymerization process at 0.02~10 g olefin/g Ziegler-Natta catalyst/hour, and preferably 0.02~6 g olefin/g Ziegler-Natta catalyst/hour.

The non-polar solvent used for the pre-polymerization can be selected from a group consisting of alkane compounds such as hexane, normal heptane, octane, nonane and decane; and cyclo aromatic compounds. Among those compounds, hexane is most preferred and is preferably purified before use so as not to affect the activity of the catalyst.

Thus, olefin is loaded on the Ziegler-Natta catalyst through the pre-polymerization, and then propylene polymerization follows. The polymerization of olefin in the presence of the catalyst of the present invention is performed in the same manner as for the polymerization of olefin using the conventional Ziegler-Natta catalyst. The reaction is carried out in the absence of oxygen and water, the reaction temperature for the polymerization of olefin is 20~100° C. and more preferably 50~180° C., and the pressure for the reaction is 1~100 a.p. and more preferably 2~50 a.p.

The final polymer prepared by the method of the present invention has a wide molecular weight distribution (Mw/Mn, 5.0±0.5), and a high tacticity of 99±1%. The melt flow rate (230° C., 2.16 kg) of the polymer is 4±2 g/10 minutes.

BEST MODE FOR CARRYING OUT THE INVENTION

Practical and presently preferred embodiments of the present invention are illustrated as shown in the following examples.

However, it will be appreciated that those skilled in the art, on consideration of this disclosure, may make modifications and improvements within the spirit and scope of the present invention.

The properties of the synthesized polymer are examined as follows.

(1) Activity

The activity of a catalyst (kg PP/g catalyst) is calculated by the weight ratio of the produced polymer (kg) to the catalyst used (g catalyst).

(2) Melt Flow Rate

Melt flow rate is measured by ASTM D1238 at 230° C. by using a 2.16 kg weight, and is presented as the weight of a polymer (g) melted for 10 minutes (g/10 min.).

(3) Tacticity

Tacticity of the polymer (%) is calculated by the weight of a non-extracted polymer in o-xylene after boiling for one-hour. Particularly, it was calculated by comparing the weights of the polymer of a blank test of o-xylene and the polymer dissolved in o-xylene. First, 200 ml of o-xylene was added to a flask, followed by filtering with 200 mm No. 4 extraction paper. An aluminum pan was dried for 30 minutes in a 150° C. oven, followed by cooling in a desicator and a weight measurement was performed. 100 ml of filtered o-xylene was obtained by using a pipette and loaded on the aluminum pan. The aluminum pan containing the o-xylene was heated at 145~150° C. to evaporate all of the o-xylene. Then, the aluminum pan was vacuum-dried at 100±5° C. for 1 hour at a pressure lower than 13.3 kP. The aluminum pan was then cooled in a desicator and the weight was measured twice (Error was less than 0.0002 g), indicating that blank test of o-xylene was finished. To measure the weight of a polymer dissolved in o-xylene, the produced polymer was dried (70° C., 13.3 kPa, 20 min., vacuum oven), followed by cooling in a desicator. 2 g±0.1 g of the polymer sample was put in a 500 ml flask, to which 200 ml of o-xylene was added. The flask was heated for one hour while connected with nitrogen and cooling water, leading to the reflux of o-xylene. Then, the flask was cooled down in air at up to 100° C. for 12~14 minutes. After the flask was well-shaken, it was precipitated in a bath (25±0.5° C.). The precipitate was filtered several times using 200 mm No. 4 extraction paper until it was completely clean. The aluminum pan was dried at 150° C. for 30 minutes, followed by cooling in a desicator, and its weight was then measured. 100 ml of filtered o-xylene was obtained with a pipette, and loaded on the aluminum pan. The aluminum pan was heated at 145~150° C. to evaporate the o-xylene. Upon completion of the evaporation, the aluminum pan was vacuum-dried at 100±5° C. for one hour at less than 13.3 kP. After cooling in a desicator, the weight was measured twice (Error was less than 0.0002 g).

$$XS = \left(\frac{Vbo}{Vb1}X(W2 - W1) - \frac{Vbo}{Vb2}XB\right) / Wo \times 100$$

XS=polymer dissolved in o-xylene, weight %
Vbo=volume of the initial o-xylene, mL (=200 ml)
Vb1=mL (=100 ml) volume of the polymer dissolved in o-xylene, mL (=100 ml)
Vb2=mL (=100 ml) volume of the o-xylene obtained for blank test, mL (=100 ml)
W2=sum of the weight of the aluminum pan and the weight of polymer remaining on the aluminum pan after evaporating o-xylene, g
W1=weight of the aluminum pan, g
Wo=weight of the initial polymer, g (=2 g)
B=average weight of the residue on the aluminum pan in blank test, g
XI=100−XS (weight ratio of the remaining polymer without being extracted with o-xylene)

(4) Molecular Weight

Molecular weight was measured by gel permeation chromatography (GPC), and both weight average molecular weight (Mw) and number average molecular weight (Mn) were measured.

(5) Polymerization Result

Polymerization results are shown in Table 1 along with apparent density (g/ml), melt flow rate (g/10 min.), the ratio of weight average molecular weight to number average molecular weight (Mw/Mn), and tacticity (weight ratio of the remaining polymer without being extracted with o-xylene (eight %)).

Preparation of a Catalyst for Pre-Polymerization

The catalyst for pre-polymerization was prepared by the following three steps.

Step 1: Preparation of a Magnesium Compound 86.8 g of a magnesium compound and 36 g of diisobutylphthalate were pulverized at 70° C. for 60 hours.

Step 2: Preparation of a Solid Titanium Catalyst 210 ml of $TiCl_4$ was added to 25 g of the magnesium-electron donor complex compound obtained in Step 1, followed by stirring at 80° C. for 2 hours. The supernatant was separated, to which 210 ml of $TiCl_4$ was added, followed by stirring at 80° C. for 2 hours. The supernatant was separated again to prepare the solid titanium catalyst.

Step 3: Surface Treatment of the Solid Titanium Catalyst

The obtained solid titanium catalyst was washed 5 times with 200 ml of purified hexane, vacuum-dried and stored. The surface treated solid titanium catalyst contained 2.0 weight % of titanium atoms.

EXAMPLE 1

Step 1: Pre-Polymerization

A 0.5 l high pressure reactor was purged with argon at high temperature. To the reactor were added 1.2 g of the catalyst obtained above, 200 ml of hexane, 5 mmol of triethyl aluminum and 1 mmol of cyclohexyldimethoxysilane. The propylene concentration was adjusted to 50 cc/min. Pre-polymerization was performed at 25 C for one hour. Upon completion of the pre-polymerization, the reactant was washed with hexane three times and vacuum-dried at room temperature for 2 hours. The content of the high molecular monomers around the catalyst prepared through pre-polymerization was 3~4 g per 1 g of catalyst.

Step 2: Polymerization

A 2 l autoclave reactor was vacuum-dried for one hour, followed by purging with nitrogen. 4.3 mmol of triethyl aluminum, 0.83 mmol of cyclohexyldimethoxysilane and the catalyst (titanium content: 8.3 ppm) were prepared with 100 ml of purified hexane at room temperature. The slurry was put in the reactor. To the reactor were added 870 ppm of hydrogen and subsequently 1.2 l of liquid propylene, followed by stirring. The reaction temperature was raised to 70° C. and polymerization was performed for one hour. Upon completion of the polymerization reaction, non-reacted gas was emitted and the temperature was lowered to room temperature to terminate the reaction. The produced polymer was recovered and dried for one hour in a 70° C. vacuum oven to give a white polymer. The polymerization results are shown in Table 1.

EXAMPLE 2

The conditions for pre-polymerization were the same as described in Example 1, except dicyclopentyldimethoxysilane was used as an external electron donor for pre-polymerization. A white polymer was prepared by the same polymerization method as described in Example 1 and 0.83 mmol of cyclohexyldimethoxysilane was used as an external electron donor for polymerization as well. The polymerization results are shown in Table 1.

EXAMPLE 3

An experiment was performed in the same manner as described in Example 1, and the same pre-polymerization catalyst as used in Example 2 was added. Dicyclopentyldimethoxysilane was used as an external electron donor for polymerization. The polymerization results are shown in Table 1.

EXAMPLE 4

To investigate the effects of moderate reaction temperature on the polymerization results, the reaction temperature was set at 15° C. and the pre-polymerization was performed in the same manner as described in Example 3. A white polymer was prepared in the same manner as described in Example 3. The polymerization results are shown in Table 1.

EXAMPLE 5

To investigate the effects of moderate reaction temperature and reaction speed on the pre-polymerization, the propylene concentration was adjusted to 50 cc/min, and the reaction was performed for 3 hours. Other than that, pre-polymerization was performed in the same manner as described in Example 4, and a white polymer was prepared in the same manner as described in Example 4. The polymerization results are shown in Table 1.

EXAMPLE 6

To investigate the effects of the external electron donor content on the pre-polymerization, 15 mmol of dicyclopentyldimethoxysilane was added. Other than that, pre-polymerization was performed in the same manner as described in Example 5, and a white polymer was prepared in the same manner as described in Example 5. The polymerization results are shown in Table 1.

EXAMPLE 7

The conditions for pre-polymerization were the same as described in Example 1, except instead of propylene, 3.9 g of 4-methyl-1-pentene was used as a monomer for pre-polymerization. Cyclohexylmethyldimethoxysilane was used as an external electron donor. A white polymer was prepared in the same manner as described in Example 3. The polymerization results are shown in Table 1.

EXAMPLE 8

The conditions for pre-polymerization were the same as described in Example 5, except instead of propylene, 3.9 g of 4-methyl-1-pentene was used as a monomer for pre-polymerization and cyclohexylmethyldimethoxysilane was used as an external electron donor. A white polymer was prepared in the same manner as described in Example 3. The polymerization results are shown in Table 1.

EXAMPLE 9

The conditions for pre-polymerization were the same as described in Example 6, except instead of propylene, 3.9 g of 4-methyl-1-pentene was used as a monomer for pre-polymerization and cyclohexylmethyldimethoxysilane was used as an external electron donor. A white polymer was prepared in the same manner as described in Example 3. The polymerization results are shown in Table 1.

EXAMPLE 10

The conditions for pre-polymerization were the same as described in Example 2, except instead of propylene, 3.9 g of 4-methyl-1-pentene was used as a monomer for pre-polymerization. Dicyclopentyldimethoxysilane was used as an external electron donor. A white polymer was prepared in the same manner as described in Example 3. The polymerization results are shown in Table 1.

EXAMPLE 11

The conditions for pre-polymerization were the same as described in Example 5, except instead of propylene, 3.9 g of 4-methyl-1-pentene was used as a monomer for pre-polymerization. Dicyclopentyldimethoxysilane was used as an external electron donor. A white polymer was prepared in the same manner as described in Example 3. The polymerization results are shown in Table 1.

EXAMPLE 12

The conditions for pre-polymerization were the same as described in Example 6, except instead of propylene, 3.9 g of 4-methyl-1-pentene was used as a monomer for pre-polymerization. Dicyclopentyldimethoxysilane was used as an external electron donor. A white polymer was prepared in the same manner as described in Example 3. The polymerization results are shown in Table 1.

COMPARATIVE EXAMPLE 1

20 mg of a catalyst without being pre-polymerized was used for polymerization and dicyclopentyldimethoxysilane was used as an external electron donor. The polymerization was performed in the same manner as described in Example 3 and the results are shown in Table 1.

COMPARATIVE EXAMPLE 2

20 mg of a catalyst without being pre-polymerized was used for polymerization and cyclohexyldimethoxysilane was used as an external electron donor. The polymerization was performed in the same manner as described in Example 1 and the results are shown in Table 1.

TABLE 1

|  | Pre-polymerization condition | | | | | Polymerization condition | | Polymerization result | | | | |
| --- | --- | --- | --- | --- | --- | --- | --- | --- | --- | --- | --- | --- |
| Example/ Comparative Example | External electron donor | Al/ Si | Olefin amount (mol) | Reaction time (hr) | Reaction Temp. (° C.) | External electron donor | Al/ Si | Activity (kgPP/ gCat) | MFR (g/10 min.) | Tacticity (%) | MWD (Mw/ Mn) | Bulk Density (g/ml) |
| Example 1 | CHDMS | 5 | 0.13 | 1 | 25 | CHDMS | 5 | 14 | 0.49 | 97.7 | 4.5 | 0.42 |
| Example 2 | DCPDMS | 5 | 0.13 | 1 | 25 | CHDMS | 5 | 14 | 1.71 | 98.1 | 4.9 | 0.42 |
| Example 3 | DCPDMS | 5 | 0.13 | 1 | 25 | DCPDMS | 5 | 16 | 2.48 | 98.5 | 5.2 | 0.41 |
| Example 4 | DCPDMS | 5 | 0.13 | 1 | 15 | DCPDMS | 5 | 16 | 2.34 | 98.5 | 4.7 | 0.42 |
| Example 5 | DCPDMS | 5 | 0.16 | 3 | 15 | DCPDMS | 5 | 18 | 2.35 | 98.9 | 5.4 | 0.40 |
| Example 6 | DCPDMS | 0.3 | 0.16 | 3 | 15 | DCPDMS | 5 | 16 | 1.92 | 98.8 | 4.7 | 0.41 |
| Example 7 | CHDMS | 5 | 0.046 | 1 | 25 | DCPDMS | 5 | 9 | 1.20 | 98.0 | 5.2 | 0.32 |
| Example 8 | CHDMS | 5 | 0.046 | 3 | 15 | DCPDMS | 5 | 13.4 | 3.33 | 98.7 | 4.9 | 0.37 |
| Example 9 | CHDMS | 0.3 | 0.046 | 3 | 15 | DCPDMS | 5 | 15.8 | 4.11 | 98.2 | 4.8 | 0.37 |
| Example 10 | DCPDMS | 5 | 0.046 | 1 | 25 | DCPDMS | 5 | 6.9 | 4.49 | 97.8 | 5.3 | 0.35 |
| Example 11 | DCPDMS | 5 | 0.046 | 3 | 15 | DCPDMS | 5 | 5.3 | 3.97 | 98.1 | 5.3 | 0.35 |
| Example 12 | DCPDMS | 0.3 | 0.046 | 3 | 15 | DCPDMS | 5 | 12.8 | 2.94 | 98.7 | 4.8 | 0.34 |
| Comparative Example 1 | | | — | | | DCPDMS | 5 | 20 | 1.71 | 98.3 | 4.6 | 0.38 |
| Comparative Example 2 | | | — | | | CHDMS | 5 | 19 | 5.80 | 97.8 | 4.9 | 0.39 |

*Polymerization conditions: hydrogen amount (hydrogen/propylene: 870 mol ppm), reaction time (1 hr), reaction temperature (70° C.)
DCPDMS: dicyclopentyldimethoxysilane, CHDMS: cyclohexyl dimethoxysilane As shown in Example 5, tacticity was as high as 98.9% when pre-polymerization was performed with dicyclopentyldimethoxysilane at a low reaction temperature of 15° C. for 3 hours (moderate conditions), whereas tacticity was not that high when pre-polymerization was not performed (Comparative Examples), when reaction temperature was high (Example 3), when reaction time was shorter (Example 4), and when cyclohexyldimethoxysilane was used for pre-polymerization or polymerization (Example 1 and Example 2). The polymer of Example 8, wherein pre-polymerization was performed with 4-methyl-1-pentene and cyclohexyldimethoxysilane at moderate reaction conditions, also exhibited high tacticity (98.7%) and the activity, hydrogen reactivity and apparent density were also improved, compared with the polymers of the Comparative Examples and Example 7, which was performed at a higher reaction temperature with a shorter reaction time. Tacticity plays a role in improving crystallinity of polymerized propylene. A high level of crystallinity increases the hardness of a resin and the strength of a product. High tacticity is a critical factor to improve the impact strength of polypropylene during copolymerization with ethylene. In addition, according to the method of the present invention, the molecular weight distribution was wider, leading to the improvement of the mechanical properties of a product. The moderate reaction conditions for pre-polymerization prevent fierce decomposition of the catalyst slurry, and produce particles of uniform size. Thus, re-coagulation is prevented and the activity and tacticity are improved. In addition, uniform size particles result in the regular morphology of the polymerized polymer. During the polymer particle forming process, the structure can be changed as desired.

In Example 3, the reaction temperature for pre-polymerization was 25° C. and reaction time was one hour, indicating that pre-polymerization was performed quickly. Accordingly, hydrogen reactivity was significantly increased during the polymerization, compared with the polymers of the Comparative Examples and other Examples. In Examples 5 and 6 and Examples 11 and 12,4-methyl-1-pentene was used as a monomer and pre-polymerization was performed in the same manner as described above. In these cases, hydrogen reactivity was also increased, compared to when propylene was used for the pre-polymerization. These results indicate that the method of the present invention can be an alternative to overcome the problems of the conventional method that has limitations in producing high flowable products because of low hydrogen reactivity. In particular, according to the method of the present invention, hollowing-out of a pump is inhibited, which has been a conventional problem resulting from the limited reaction pressure and poor hydrogen solubility during bulk slurry polymerization, so that a polymer with high fluidity can be prepared with a small amount of hydrogen. In Example 3, the polymer exhibited a wider molecular weight distribution, compared with those polymers prepared in the Comparative Examples, wherein pre-polymerization was not performed, or in Examples 1 and 2 wherein cyclohexyldimethoxysilane was used for pre-polymerization or polymerization.

In Example 4, the degree of pre-polymerization was adjusted to a level between that of Example 3 and Example 5. As a result, the polymerization results were between Example 3 and Example 5.

In Example 6, the amount of the external electron donor used for pre-polymerization was increased, that is the ratio of triethylaluminum to dicyclopentyldimethoxysilane was 0.3. Compared with the results of Example 5, hydrogen reactivity in this example was lower, and tacticity and molecular weight distribution were not improved. However, when 4-methyl-1-pentene was used as a monomer, the result was different. Compared with the results of Examples 8 and 9 wherein cyclohexyldimethoxysilane was used for pre-polymerization, the activity of the polymer and hydrogen reactivity were improved with the increase of the external electron donor, but tacticity was reduced. Compared with the results of Examples 11 and 12 wherein dicyclopentyldimethoxysilane was used for pre-polymerization, the activity of the polymer was increased with the increase of the external electron donor but tacticity and molecular weight distribution were reduced.

The purpose of Examples 1 and 2 was to investigate the effect of an external electron donor on pre-polymerization or polymerization. Using cyclohexyldimethoxysilane decreased the activity, hydrogen reactivity and tacticity, compared with using dicyclopentyldimethoxysilane. Compared with the results of Comparative Examples 1 and 2, when the pre-polymerized catalyst was used for polymerization, the activity was a little reduced because the catalytic active sites were decreased during the transportation to the polymerization reactor, but when pre-polymerization was performed with dicyclopentyldimethoxysilane at high temperature within a short reaction time, hydrogen reactivity was increased, and when the pre-polymerization was performed at moderate conditions, the activity was maintained without being lowered and tacticity was increased. As a result, compared with the Comparative Examples wherein pre-polymerization was not performed, the polymers produced after being through pre-polymerization exhibited improved hydrogen reactivity, tacticity, molecular weight distribution and apparent density.

INDUSTRIAL APPLICABILITY

According to the polymerization method of the present invention, a polymer having a wide molecular weight distribution and improved hydrogen reactivity can be obtained from the polymerization of propylene. The polypropylene polymerized by the method of the present invention exhibited high tacticity with low xylene extract and improved apparent density, suggesting the high productivity of the polymerization process.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the present invention as set forth in the appended claims.

The invention claimed is:

1. A method of polymerizing propylene comprising the following steps:
pre-polymerizing propylene or 4-methyl-1-pentene with a Ziegler-Natta catalyst in the presence of dicyclopentyldimethoxysilane at the reaction temperature of 0 to 40° C. in the reaction time of 0.5 to 5 hours; and
polymerizing propylene with the pre-polymerized Ziegler-Natta catalyst
wherein the Ziegler-Natta catalyst contains a titanium compound comprising elements of family 4, family 5 or family 6 of the periodic table, and an aluminum compound, and
when propylene is pre-polymerized with a Ziegler-Natta catalyst, the ratio of Al to Si is 1:10; and
when 4-methyl-1-pentene is pre-polymerized with a Ziegler-Natta catalyst, the ratio of Al to Si is 0.1:1.

2. The method of polymerizing propylene according to claim 1, wherein the molar ratio of the aluminum compound to the titanium compound is 5-50:95-50.

3. The method of polymerizing propylene according to claim 1, wherein the titanium compound is a solid titanium catalyst containing magnesium, titanium, a halogen element and an internal electron donor.

4. The method of polymerizing propylene according to claim 1, wherein the aluminum compound is selected from a group consisting of a triallyl aluminum, a diallyl aluminum halide, an allyl aluminum dihalide, an aluminum diallyl hydride, an allyl aluminum sesquihalide, and a mixture thereof.

5. The method of polymerizing propylene according to claim 1, wherein the aluminum compound is selected from a group consisting of $Al(C_2H_5)_3$, $Al(C_2H_5)_2H$, $Al(C_3H_7)_3$, $Al(C_3H_7)_2H$, $Al(i-C_4H_9)_2H$, $Al(C_8H_{17})_3$, $Al(C_{12}H_{25})_3$, $Al(C_2H_5)(C_{12}H_{25})_2$, $Al(i-C_4H_9)(C_{12}H_{25})_2$, $Al(i-C_4H_9)_3$, $(C_2H_5)_2AlCl$, $(i-C_4H_9)_2AlCl$, and $(C_2H_5)_3Al_2Cl_3$.

6. The method of polymerizing propylene according to claim 1, wherein the aluminum compound is selected from a group consisting of a mixture of $Al(C_2H_5)_3$ and $Al(i-C_4H_9)_3$; a mixture of $Al(C_2H_5)_3$ and $Al(C_8H_{17})_3$; a mixture of $Al(C_4H_9)_2H$ and $Al(C_8H_{17})_3$; a mixture of $Al(i-C_4H_9)_3$ and $Al(C_8H_{17})_3$; a mixture of $Al(C_2H_5)_3$ and $Al(C_{12}H_{25})_3$; a mixture of $Al(i-C_4H_9)_3$ and $Al(C_{12}H_{25})_3$; a mixture of $Al(C_2H_5)_3$ and $Al(C_{16}H_{33})_3$; and a mixture of $Al(C_3H_7)_3$ and $Al(C_{18}H_{37})_2(i-C_4H_9)$.

7. The method of polymerizing propylene according to claim 1, wherein the molar ratio of dicyclopentyldimethoxysilane to the titanium compound is 0.1 to 50.

8. The method of polymerizing propylene according to claim 1, wherein propylene or 4-methyl-1-pentene is added at the pre-polymerization step in the amount of 0.02 to 10 g propylene or 4-methyl-1-pentene/g Ziegler-Natta catalyst/hour.

9. The method of polymerizing propylene according to claim 1, wherein propylene or 4-methyl-1-pentene is added at the pre-polymerization process in the amount of 0.02 to 6 g propylene or 4-methyl-1-pentene/g Ziegler-Natta catalyst/hour.

10. The method of polymerizing propylene according to claim 1, wherein the molecular weight distribution (Mw/Mn) of the produced polymer is 5.0±0.5.

11. The method of polymerizing propylene according to claim 1, wherein the tacticity of the produced polymer is 99±1%.

12. The method of polymerizing propylene according to claim 1, wherein the melt flow rate (230° C., 2.16 kg) of the produced polymer is 4±2 g/10 minutes.

* * * * *